W. J. QUARRY.

Method of Mounting Show Cards, Maps, &c.

No. 9,765. Reissued June 14, 1881.

Attest:
J. E. Bloom.
E. H. Layman.

Inventor.
William J. Quarry
by James H. Layman
Attorney.

N. PETERS, Photo-Lithographer, Washington, D. C.

UNITED STATES PATENT OFFICE.

WILLIAM J. QUARRY, OF CINCINNATI, OHIO.

METHOD OF MOUNTING SHOW-CARDS, MAPS, &c.

SPECIFICATION forming part of Reissued Letters Patent No. 9,765, dated June 14, 1881.

Original No. 189,903, dated April 24, 1877. Application for reissue filed May 19, 1881.

*To all whom it may concern:*

Be it known that I, WILLIAM J. QUARRY, of Cincinnati, Hamilton county, Ohio, have invented a new and useful Mode of Mounting Cards, Maps, Charts, Prints, and other Illustrations or Designs, of which the following is a specification.

The object of my invention is to mount business-cards, maps, prints, &c., in such a manner as to dispense with the customary wooden stretcher, and thereby obviate the increased cost and defects of construction incidental to the use of these well-known supports for illustrations or designs.

To accomplish this result the outer or exposed face of the card or print is glued or cemented at its margins and then fastened to the rear side of a frame, so as to be permanently attached thereto, after which act a suitable backing is applied to said mounted card or print.

By this construction the support to which the print is permanently attached serves the twofold purpose of a stretcher and an ornamental protecting-frame, while the backing not only stiffens the entire structure, but it also prevents the picture being readily dented or perforated by contact with any object, as hereinafter more fully described, and pointed out in the claim.

Figure 1:
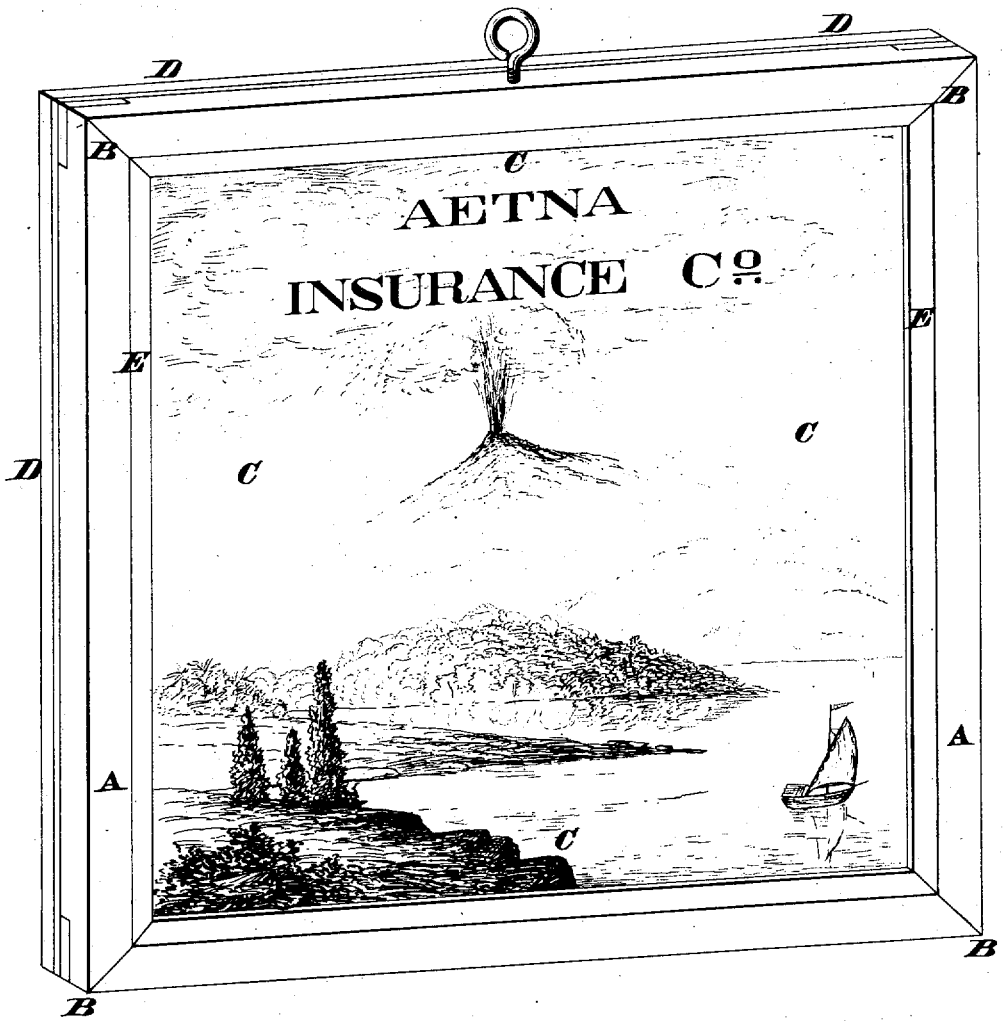
Figure 2:
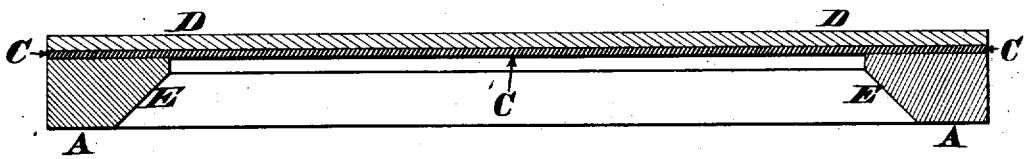

In the annexed drawings, Figure 1 is a perspective view of a show-card or other illustration mounted and backed according to my improved method. Fig. 2 is a horizontal section of the same.

A represents a customary frame united at its corners by miter-joints B.

C is the show-card or other illustration, which picture may be printed or otherwise portrayed upon the card-board or other suitable material, and then be attached to said frame A in the following manner:

The pictorial face of the card C is first glued or cemented at its four margins or edges, and is at once applied to the rear side of frame A, so as to display outwardly the illustration on said card, or, in other words, so as to present the picture to the observer, and not turn its face inward or away from him, as erroneously described in my old patent, No. 189,903, of which this is a reissue. The print or other illustration having been thus permanently secured to the frame, a backing, D, of stiff straw, tar, or other board, is now applied to the rear of the mounted card, which act completes the operation. This backing may be cemented to the entire rear surface of the card, map, or other picture, or only to such portions of the same as are fastened to the frame A—that is to say, to the margins of the print. Furthermore, as a means of adding to the attractiveness of the mounted print, I prefer to mold, carve, or otherwise shape or ornament the exposed face or front of the frame, as shown at E.

Among the advantages incidental to this method of mounting cards, &c., the following may be mentioned:

First, the support A serves the twofold purpose of a stretcher proper and of an ornamental protecting-frame, that shields the outer surface of the prints when they are packed for transportation.

Second, the picture being first stretched and cemented or glued at its margins, and then permanently fastened to the frame, cannot possibly shrink or wrinkle and become unsightly on this account.

Third, the backing protects the picture from injury at the rear and prevents the frame being twisted or warped out of its proper shape.

Finally, it is apparent that any picture mounted as herein described combines the advantages of being protected both in front and rear, and of having a more finished and attractive appearance than if applied to an ordinary stretcher in the customary manner.

I am aware it is not new to attach prints, &c., temporarily to the back of a frame with a system of clasps, hooks, and springs, as such an arrangement is seen in the patent granted to S. W. Hanks, November 20, 1866, No. 59,836.

Such being the state of the art, my claim is not to be construed as an attempt to cover the idea of applying a picture to the back of a frame in any and every manner, but the invention is expressly limited to a card, &c., permanently secured at its front edges to the rear side of a frame, and then protected with a suitable backing, as herein explained.

I claim as my invention—

As a new article of manufacture, a card, map, chart, print, or other illustration, permanently glued or cemented at its front margins to the rear side of a frame, so as to present the picture outwardly, the card being protected with a suitable backing behind said frame, as herein described.

In testimony whereof I affix my signature in presence of two witnesses.

WILLIAM J. QUARRY.

Witnesses:
JAMES H. LAYMAN,
SAML. S. CARPENTER.